US005138346A

United States Patent [19]

Muto

[11] Patent Number: 5,138,346

[45] Date of Patent: Aug. 11, 1992

[54] RECORDING ELECTRODE AND IMAGE FORMING APPARATUS USING THE SAME

[75] Inventor: Hakaru Muto, Yokohama, Japan

[73] Assignee: Canon Kabushiki Kaisha, Tokyo, Japan

[21] Appl. No.: 658,243

[22] Filed: Feb. 20, 1991

[30] Foreign Application Priority Data

Feb. 20, 1990 [JP] Japan .................................... 2-39029

[51] Int. Cl.[5] ........................ G01D 15/06; B29C 65/00

[52] U.S. Cl. .................................. 346/155; 156/304.1

[58] Field of Search .............. 346/155; 156/297, 304.1

[56] References Cited

U.S. PATENT DOCUMENTS 3,914,771 10/1975 Lunde et al. .......................... 346/74
4,534,814 8/1985 Volpe et al. .................... 346/155 X
4,739,348 4/1988 Ando et al. ......................... 346/155
4,788,564 11/1988 Ochial ............................. 346/153.1
4,806,957 2/1989 Beegan ............................... 346/155
4,843,191 6/1989 Thomas ........................... 156/297 X
5,000,811 3/1991 Campanelli .................. 156/304.1 X
5,001,501 3/1991 Imai et al. ........................ 346/160.1
5,034,083 7/1991 Campanelli et al. ............ 156/297 X
5,045,142 9/1991 Drake et al. .................... 156/297 X

FOREIGN PATENT DOCUMENTS 51-46707 12/1976 Japan .

*Primary Examiner*—George H. Miller, Jr.
*Attorney, Agent, or Firm*—Fitzpatrick, Cella, Harper & Scinto

[57] ABSTRACT

The present invention permits an extension of a recording electrode used with a recording system in which a toner image is formed on a recording medium in response to the recording electrode by applying toner to a space between the recording medium and the recording electrode and by applying a voltage, without deteriorating an image quality. Each electrode member is constituted, by a plurality of conductive portions arranged in a longitudinal direction and a plurality of insulating portions for ensuring the electrical insulation between the adjacent conductive portions, and the recording electrode is constituted by connecting m electrode members with electrically connecting the adjacent conductive portions to each other. The present invention also provides a recording system using such recording electrode.

14 Claims, 5 Drawing Sheets

S=20/1

RECORDING ELECTRODE AND IMAGE FORMING APPARATUS USING THE SAME

BACKGROUND OF THE INVENTION

1. Field of the Invention

The present invention relates to a recording technique wherein an image is formed by supplying toner between a recording medium and a recording electrode which are disposed to be spaced apart from each other, and more particularly, it relates to a large-sized recording electrode used with such recording technique.

2. Related Background Art

An image forming process wherein a developer (toner) is adhered to a recording medium by using a recording electrode is already known as disclosed in the Japanese Patent Publication No. 51-46707 (U.S. Pat. No. 3,914,771) and the like. In this image forming process, as shown in FIG. 4, electroconductive and magnetic toner (referred to as merely "toner" hereinafter) 1 having a resistance of $10^3$–$10^9$ Ω·cm is conveyed on a non-magnetic cylinder 3 made of stainless steel, aluminum or the like by means of a rotary magnet 2 to pass through a recording electrode 4 made of conductive material such as metal. A voltage is applied between a conductive layer 7 of a recording medium 5 including an insulation layer 6 having a thickness of 1–20 μm and a resistance of $10^7$–$10^{16}$ Ω·cm and the recording electrode 4, whereby the toner is adhered to the recording medium 5, thus forming the image.

FIG. 5 shows, in section, a whole construction of a display device using such image forming process.

In FIG. 5, the reference numeral 1 denotes the toner; 4 denotes the recording electrode; 5 denotes a recording medium comprising an endless belt (referred to as "recording belt" hereinafter); 8 denotes an erasing member utilizing a sliding friction function; 10 denotes a toner container; 11 denotes support rollers for supporting the recording belt 5; 12 denotes a body frame having an optical displaying opening 25 formed therein; and 13 denotes a recording control portion. Prior arts regarding such display device are disclosed or described in U.S. Pat. Nos. 4,739,348 and 4,788,564 and U.S. Ser. No. 401,243 (filed on Aug. 31, 1989 in USA), now U.S. Pat. No. 5,001,501).

With this arrangement, the image is formed by the fact that the toner is adhered or not adhered to the recording belt 5 in response to a signal voltage from the recording electrode 4. For example, when the signal voltage of 40 V is applied from the recording control portion 13, the toner 1 is electrically adhered to the recording belt 5, whereas, when no signal voltage is applied, the toner is not adhered to the recording belt due to the attracting force of the magnet 2, thus forming the image on the recording medium. After the toner image is formed, by rotating the recording belt supporting roller 11 by means of a motor (not shown), the recording belt 5 is conveyed in a direction shown by the arrow. After the image is displayed, the toner 1 is electrostatically removed and mechanically stripped from the recording belt 5 by the erasing member 8 made of conductive carbon fibers, conductive resin or conductive rubber. The toner 1 is dropped onto the toner container 10 by its own weight, thus preparing for the next recording operation.

FIG. 6 is a schematic front view of the recording electrode 4 used with such image recording system.

An electrode member constituting the recording electrode 4 is constituted by conductive portions 4*a* of the electrode made of copper and the like and insulating portions 4*b* made of polyamide and the like which are disposed on a flexible print substrate 4*c* by an etching treatment. Further, on the flexible print substrate 4*c*, there are arranged IC elements (not shown) for activating the conductive portions 4*a*, IC elements (not shown) for latching image information inputted from an external equipment, connectors (not shown) connecting to cables for inputting the image signal, power source and recording power source, and the like.

FIG. 7 shows the conductive portions 4*a* and the insulating portions 4*b* of the recording electrode in an enlarged scale, wherein a distance between the adjacent conductive portions 4*a* (internal of the insulating portions) is 0.26 mm and a distance between the adjacent insulating portions 4*b* (width of the conductive portion) is 0.11 mm. In the recording process used in this conventional example, although it is desirable that the interval of the insulating portions 4*b* is smaller as much as possible, due to the limitation of the etching treatment technique, when a thickness of a copper foil constituting the conductive portion 4*a* is 16 μm, the width of the insulating portion is limited to about 0.1 mm at the minimum. If the insulating portion 4*b* having a width less than 0.1 mm is used, the adjacent conductive portions 4*a* are short-circuited with each other, thus giving rise to a problem that each conductive portion cannot be independent from other conductive portions. Further, the width of each conductive portion 4*a* is determined by the number of pixels for the image and normally, 1680 pixels are included in the width of the conductive portion. In this case, a width of the recording electrode becomes:

$$1680\times(0.26\ \text{mm}+0.11\ \text{mm})=621.6\ \text{mm}.$$

Further, recently, a large-sized display device has been wanted or required, and accordingly, the above-mentioned width of the recording electrode cannot meet such requirement. For example, although the recording electrode having a width of 1.5 m has been required, since the normal flexible print plate constituting a base of the recording electrode has merely a dimension of 800 mm×800 mm, it was impossible to manufacture the recording electrode having the width of 1.5 m in one piece. Thus, in the past, two recording electrodes each having a width of 750 mm were manufactured and these electrodes were arranged side by side and connected by adhering the end insulating portions thereof to each other, thus obtaining the recording electrode having the width of 1500 mm.

FIG. 8 shows the recording electrode having the width of 1500 mm schematically FIG. 9 shows, in section, a connecting portion between two recording electrodes, and FIG. 10 shows the connecting portion as a plan view. In this connecting portion, since the insulating portions 4*b* of two recording electrodes are adhered to each other, as apparent from these Figures, the width of the insulating portion across the connecting portion is not 0.11 mm.

The images formed by using the recording electrode shown in FIGS. 8 to 12 are shown in FIGS. 11 and 12.

FIG. 11A shows an all black image (having no white area therein). However, in the conventional technique, since the pitch between the conductive portions in the connecting portion is wider, a problem that a white stripe is generated occurs, as shown in FIG. 11B. On the other hand, FIG. 12 shows an image comprising white and black stripes alternately. However, in the conventional technique, as shown in FIG. 12B, there arises a problem that the width or pitch of the white stripe in the connecting portion is wider and a ghost is generated in this white stripe. The reason is that the toner is clogged in the connecting portion and this toner is adhered to a recording sheet. Incidentally, a condition that the toner is clogged in the connecting portion is shown in FIG. 9.

SUMMARY OF THE INVENTION

An object of the present invention is to solve the above-mentioned problems that occur in the conventional recording electrode.

Another object of the present invention is to provide a recording electrode which can provide a large-sized recording system without deteriorating the image quality.

In order to achieve the above objects, the present invention provides a recording electrode used with a recording system in which a toner image is formed on a recording medium in response to the recording electrode by supplying toner to a space between the recording medium and the recording electrode and by applying a voltage, and wherein each electrode member is constituted by a plurality of conductive portions arranged in a longitudinal direction and a plurality of insulating portions for ensuring the electrical insulation between the adjacent conductive portions, and the recording electrode is constituted by connecting m ($m \geqq 2$) electrode members by electrically connecting the adjacent conductive portions to each other.

DETAILED DESCRIPTION OF THE PREFERRED EMBODIMENTS

Figure 1:
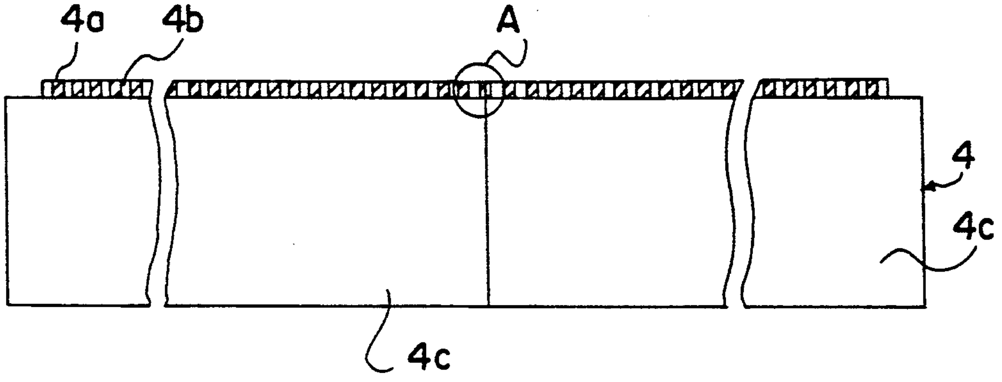
FIG. 1 is an elevational view of a recording electrode according to a preferred embodiment of the present invention.
Figure 2:
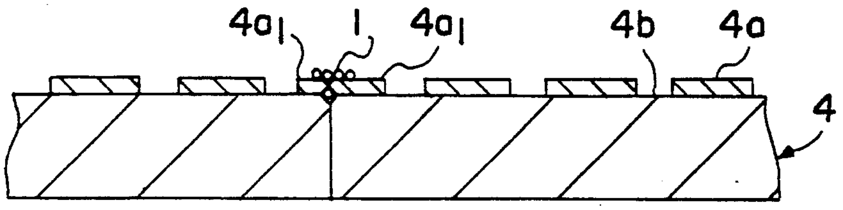
FIG. 2 is an enlarged view of a portion of the recording electrode of FIG. 1.

FIG. 1 shows a recording electrode according to a preferred embodiment of the present invention. In this embodiment, two electrode members 4c each having n conductive portions (electrode portions) are adhered to each other to form a recording electrode 4. FIG. 2 shows portion A in FIG. 1 in an enlarged scale, and FIG. 3 is a plan view of the portion A.

Figure 3:
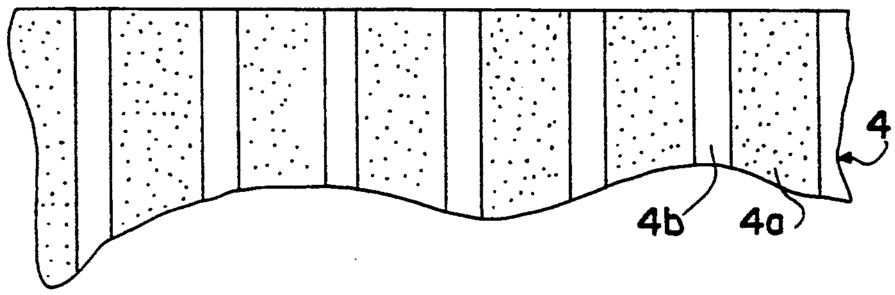
FIG. 3 is a plan view of a portion of the recording electrode of FIG. 2.
Figure 11A:
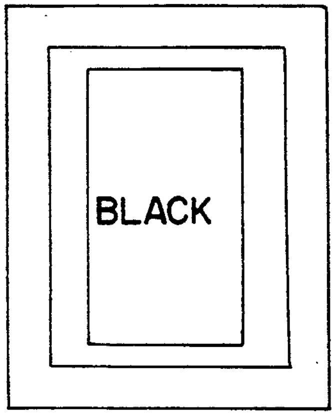
FIGS. 11A to 11C are plan views showing an all black image.
Figure 11B:
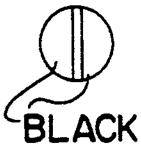
Figure 11C:
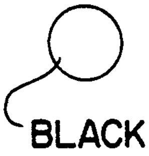
Figure 12A:
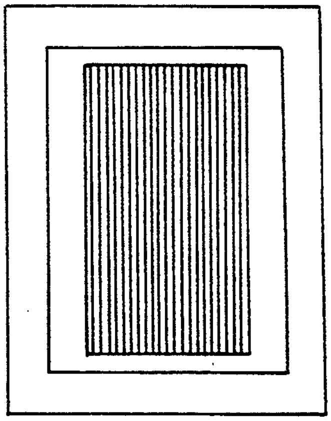
FIGS. 12A to 12C are plan views showing an image including alternate white and black stripes.
Figure 12B:
Figure 12C:

Images recorded by using the recording electrode 4 shown in FIGS. 1 to 3 are shown in FIGS. 11C and 12C. As apparent from FIGS. 11C and 12C, an all black image and an image having alternate white and black stripes are correctly displayed.

Explaining the embodiment of the present invention fully with reference to FIG. 2, in the present invention, the electrode members are adhered to each other by electrically connecting adjacent end conductive portions $4a_1$, $4a_2$ of the adjacent electrode members. Thus, toner 1 which is conductive is clogged in the connecting portion, thereby keeping the adhered conductive portions $4a_1$, $4a_2$ the same electric potential. Further, by adhering the conductive portions 4a, even if the total width of a conductive portion obtained by adhering two portions to each other becomes 0.3 mm, which is larger than the other conductive portions having a normal width of 0.26 mm, since the image is displayed as a black line in an auxiliary scanning direction, as shown in FIG. 12C, there is no visual problem regarding the recorded image.

Figure 4:
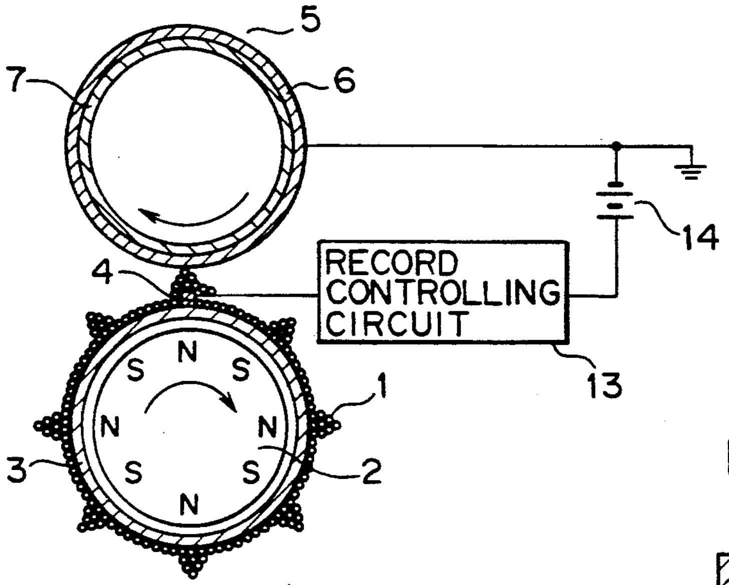
FIG. 4 is a view for explaining a recording principle.
Figure 5:
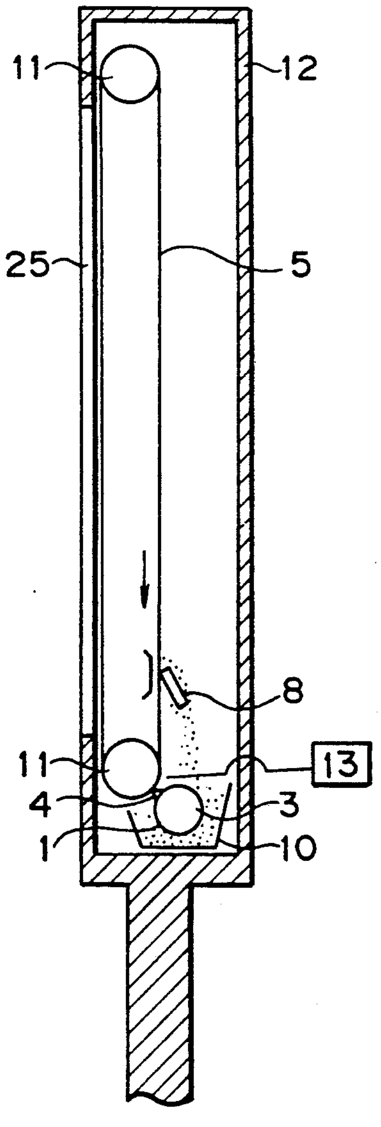
FIG. 5 is a sectional side view showing an example of a conventional image forming system.
Figure 6:
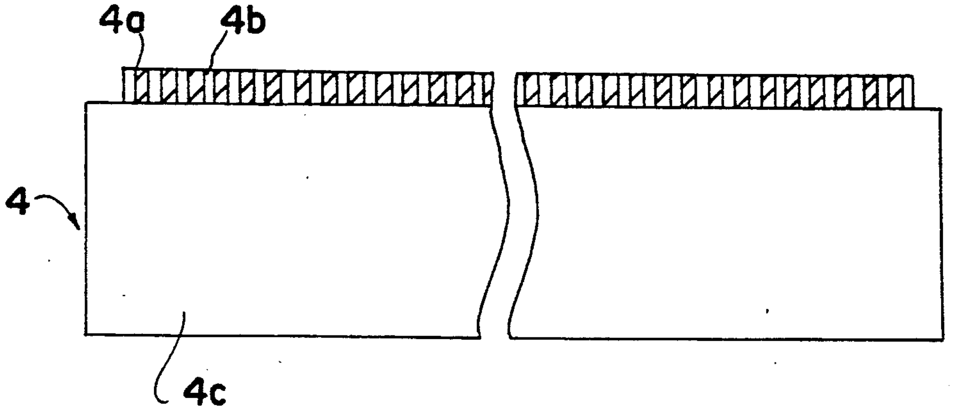
FIG. 6 is an elevational view of a recording electrode in the system of FIG. 5.
Figure 7:
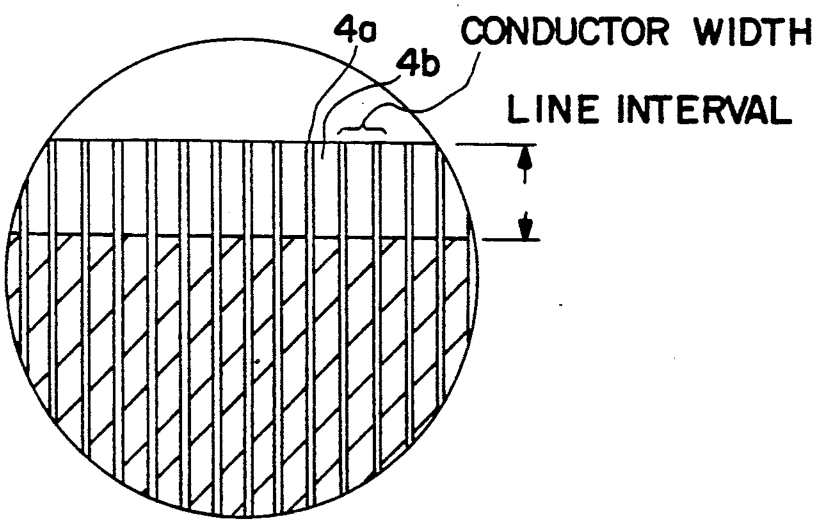
FIG. 7 is an enlarged view of a portion of the recording electrode of FIG. 6.
Figure 8:
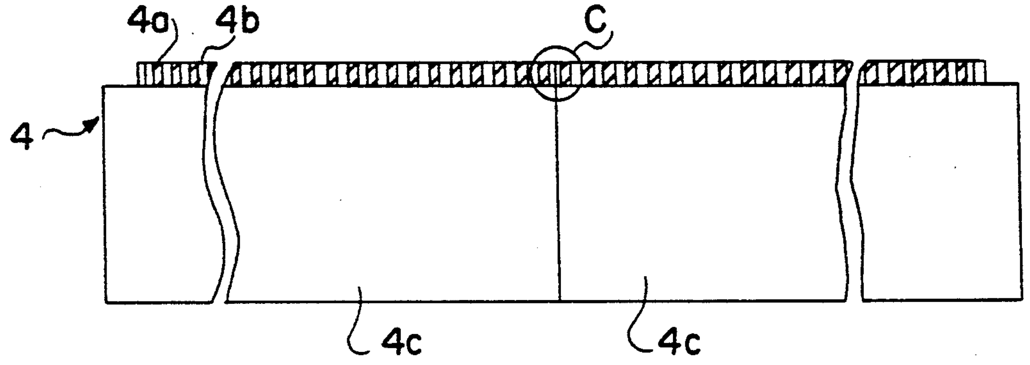
FIG. 8 is an elevational view of conventional recording electrodes adhered to each other.
Figure 9:
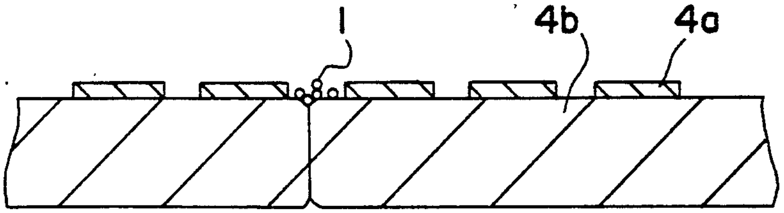
FIG. 9 is an enlarged view of a connecting portion of the electrodes of FIG. 8.
Figure 10:
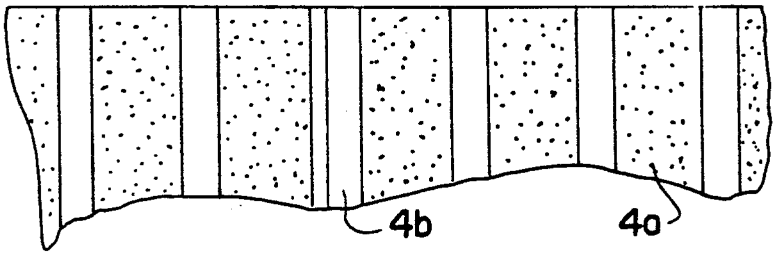
FIG. 10 is a plan view of a portion of the recording electrodes of FIG. 9.

Incidentally, in the illustrated embodiment, while an example that the recording electrode is constituted by two electrode members was explained, even when three or more electrode members are used, the same function and effect can be attained. Further, the present invention is not limited to the above-mentioned display device (FIG. 5), but can be applied to an image forming portion of a printer, copying machine and the like utilizing the image forming phenomenon as described with reference to FIG. 4.

In order to adhere the electrode members to each other, when each electrode member comprises a flexible print plate, the electrode members (print plates) may be arranged side by side on a rigid support and they may be interconnected by adhesive and the like. When each electrode member itself is thicker, the electrode members may be adhered to each other by applying conventional conductive adhesive to end surfaces of the electrode members to be connected. The electrode can be made of stainless steel, nickel as well as copper, and the insulating member can be made of synthetic resin such as polyethylene, polypropylene and the like.

As mentioned above, according to the present invention, since the electrode members are adhered to each other by interconnecting the conductive portions rather than the insulating portions, it is possible to eliminate the generation of the missing image portion and/or the excessive image portion in the recorded image due to the construction of the connecting portion.

What is claimed is:

1. A recording electrode used with a recording system in which a toner image is formed on a recording medium using a recording electrode by applying toner to a space between said recording medium and the recording electrode and by applying a voltage, wherein the recording electrode includes m electrode members ($m \geqq 2$), each electrode member is constituted of a plurality of conductive portions arranged in a longitudinal direction and a plurality of insulating portions for ensuring electrical insulation between the adjacent conductive portions, and the recording electrode is constituted by connecting the electrode members by electrically connecting the adjacent conductive portions of adjacent electrode members to each other.

2. A recording electrode according to claim 1, wherein each electrode member is formed by arranging metallic electrode portions on a flexible resin at a predetermined distance.

3. A recording electrode according to claim 2, wherein each electrode member is formed by etching a metallic foil layer deposited on the flexible resin.

4. A recording electrode according to claim 2, wherein said electrode members are interconnected by conductive adhesive.

5. A recording system for forming a toner image on a recording medium by applying a voltage to a recording electrode, said system comprising:

a recording electrode constituted by connecting a electrode members ($m \geqq 2$), each electrode member having a plurality of conductive portions arranged in a longitudinal direction and a plurality of insulating portions for ensuring the electrical insulation between the adjacent conductive portions, wherein the electrode members are connected by electrically connecting the adjacent conductive portions of adjacent electrode members to each other;

a recording medium disposed to be spaced apart from said recording electrode;

a drive means for shifting said recording electrode and said recording medium relative to each other; and a toner supplying means for supplying toner between said recording medium and said recording electrode.

6. A recording system according to claim 5, wherein said toner is magnetic toner, and said toner supplying means utilizes a magnetic field.

7. A recording system according to claim 6, wherein said toner supplying means comprises a rotary magnet having a plurality of magnetic poles, and a fixed non-magnetic sleeve.

8. A recording system according to claim 7, wherein said recording electrode is arranged on said non-magnetic sleeve.

9. A recording system according to claim 6, wherein each electrode member is formed by arranging metallic electrode portions on a flexible resin at a predetermined distance, each electrode member is formed by etching a metallic foil layer deposited on said flexible resin, and said electrode members are interconnected by conductive adhesive.

10. A recording system for forming a toner image on a recording medium by applying a voltage to a recording electrode, said system comprising:

a recording electrode constituted by connecting m electrode members ($m \geqq 2$), each electrode member having a plurality of conductive portions arranged in a longitudinal direction and a plurality of insulating portions for ensuring the electrical insulation between the adjacent conductive portions, wherein the electrode members are connected by electrically connecting the adjacent conductive portions of adjacent electrode members to each other;

an endless recording medium disposed to be spaced apart from said recording electrode;

a drive means for shifting said recording medium endlessly;

a toner supplying means for supplying toner between said recording medium and said recording electrode; and a casing having an optical opening, for displaying the toner image formed on said recording medium.

11. A recording system according to claim 10, wherein said toner is magnetic toner, and said toner supplying means utilizes a magnetic field.

12. A recording system according to claim 11, wherein said toner supplying means comprises a rotary magnet having a plurality of magnetic poles, and a fixed non-magnetic sleeve.

13. A recording system according to claim 11, wherein said recording electrode is arranged on said non-magnetic sleeve.

14. A recording system according to claim 13, wherein each electrode member is formed by arranging metallic electrode portions on a flexible resin at a predetermined distance, each electrode member is formed by etching a metallic foil layer deposited on said flexible resin, and said electrode members are interconnected by conductive adhesive.

* * * * *

UNITED STATES PATENT AND TRADEMARK OFFICE
CERTIFICATE OF CORRECTION

PATENT NO. : 5,138,346

DATED : August 11, 1992

INVENTOR(S) : HAKARU MUTO

It is certified that error appears in the above-identified patent and that said Letters Patent is hereby corrected as shown below:

AT [57] ABSTRACT:

Line 4, "in re-" should read --using--;

Line 5, "sponse to" should be deleted;

Line 9, "constituted, by a" should read --constituted of a--.

COLUMN 5:

Line 14, "a" (second occurrence) should read --m--.

Signed and Sealed this

Twenty-sixth Day of October, 1993

Attest:

BRUCE LEHMAN

Attesting Officer

*Commissioner of Patents and Trademarks*